United States Patent [19]
Johnson

[11] 3,899,657
[45] Aug. 12, 1975

[54] ELECTRIC HEATING DEVICE FOR INTERNALLY COOKING A MEAT PRODUCT

[76] Inventor: Jarl Johnson, 18 Crestview Dr., Somers, Conn. 06071

[22] Filed: June 20, 1973

[21] Appl. No.: 371,720

[52] U.S. Cl. ............... 219/523; 7/1 A; 30/164.5; 99/419; 219/202; 219/241; 219/242; 219/533
[51] Int. Cl. .................. H05b 3/48; A47j 37/00
[58] Field of Search ........... 219/523, 202, 354, 533, 219/242, 358, 241, 510, 512, 521; 338/238, 243; 30/164.5; 7/1 A, 14.1 R; 99/419–421, 442

[56] References Cited
UNITED STATES PATENTS

| | | | |
|---|---|---|---|
| 1,459,307 | 6/1923 | Laise et al. | 219/523 X |
| 1,520,670 | 12/1924 | Appel | 30/164.5 |
| 1,802,532 | 4/1931 | Pulver | 219/523 X |
| 1,902,564 | 3/1933 | Mabey | 99/419 |
| 1,990,412 | 2/1935 | Merritt | 99/419 X |
| 2,272,282 | 2/1942 | Wiegand | 338/238 X |
| 2,333,207 | 11/1943 | Smith | 219/241 |
| 2,624,295 | 1/1953 | Puls | 219/523 X |
| 2,789,201 | 4/1957 | Sherwin | 219/523 |
| 2,835,480 | 5/1958 | Perez | 99/419 X |
| 2,848,914 | 8/1958 | Gottfried | 7/14.1 R |
| 2,858,403 | 10/1958 | Butler | 219/523 UX |
| 2,918,561 | 12/1959 | Perez | 219/523 |
| 3,560,704 | 2/1971 | Albert | 219/242 |
| 3,692,975 | 9/1972 | Markus et al. | 219/202 |

Primary Examiner—A. Bartis
Attorney, Agent, or Firm—Ross, Ross & Flavin

[57] ABSTRACT

An electric heating device is provided for internally cooking and/or heating a meat product and an associated bakery product. The device is insertable into the center of the meat product so that the cooking thereof ensues from centrally of the product radially outwardly toward the outer surfaces thereof. The device comprises an elongated electric heating element encapsulated in a sheathing of electrical insulating material. A tubular outer metallic heat conductive shell surrounds the heating element and sheathing and a terminal extends out of each end of the shell. One end of the heating element is connected to one terminal and the other end is connected to the other terminal through a thermal switch in the outer shell and encapsulated within the electrical insulating material. One end of the outer shell is crimped to form a pair of diametrically opposed wing-like appendages to facilitate manipulation of the device during use. A combination manipulating handle and reaming tool is provided for handling the heating device when hot and for preparing the hole in the product for receiving the heating device.

1 Claim, 7 Drawing Figures

ELECTRIC HEATING DEVICE FOR INTERNALLY COOKING A MEAT PRODUCT

The invention relates to a means for heating and cooking a prepared meat product through the use of a heating assembly which is inserted into the internal center area of a product in manner so that the heating and cooking process ensues from centrally of the product radially outwardly toward the outside surfaces thereof.

The invention envisions that such as a frankfurter or hamburg or beef roulade or other meat product may be cooked which cooking may be conjointly with or without its cooperant roll or bun or other bakery product.

The invention is contemplated primarily for portable use in connection with vehicle or boat battery power, although other use, as in a household or restaurant or elsewhere, or automated use such as by way of a vending machine, is comprehended.

Essentially, the simplest version of the invention envisions the use of a predetermined wattage element but a more sophisticated version may envision the use of a preset internally-located thermal switch.

A primary and most significant purpose of the invention is to offer the novelty of and the convenience of use while a vehicle or boat and its passengers are en route to a destination. For instance, a number of frankfurters may be cooked and consumed while en route.

All of such use is contemplated as being allowed so as to dictate a minimum of confusion and mess in the surrounding area and as to allow a quick and ready clean up situation.

A further primary object of the invention is to provide a cooker of simple and novel construction by means of which the food elements of meat and enveloping baked product may be conveniently cooked uniformly in manner such that the natural juices of the meat are conserved and allowed to permeate the encapuslating bread wherefore the true flavor of the former is imparted to the latter and a more succulent and tasty edible is obtained than has heretofore been possible.

Designwise, the invention offers an efficiency of service and power in the respect that it allows the heating of the meat product while encapsulated by, and having the advantage of the insulation of, the supporting roll or bun, the majority of the heat being delivered to the meat product rather than being radiated or conducted to atmosphere.

The structure of the invention is simple in its design so as to facilitate its ready insertion into the meat product, and conversely, its ready removal therefrom.

Figure 1:
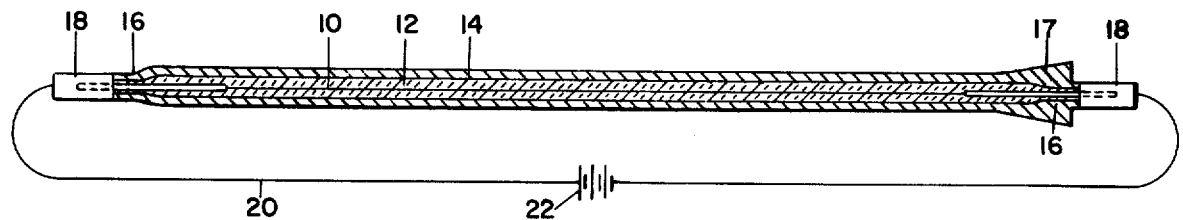
FIG. 1 is a view in section showing the cooking assembly of the invention.

The cooking assembly of the invention comprises a centrally disposed longitudinally-extending heating element 10 in the form of a wire or carbon of good electrical conductance which is circumscribed throughout its length by a sheathing of an insulator 12, (say being constituted by a suitable type of ceramic), or taking the configuration of such as a woven glass fiber cloth enwrapped around the heating element.

The combined heating element 10 and insulator 12 are encased within an outermost heat conductive shell 14 of such as extruded aluminum tubing or a wrap-around covering of aluminum sheeting, the outer exterior of which shell or sheeting is preferentially smooth and may even be coated with such as Teflon or anodized so as better to insure the prevention of unwanted adherance of any meat product to such surface.

An alternate type of insulator 12 may take the form of a chemical oxide or silicate etched to the internal wall of aluminum shell or sheeting 14, all without departing from the letter or spirit of the invention.

At opposite ends of the arrangement, outer shell 14 is suitably crimped as at 16 in known sealing manner so as to embrace the shank of a respective insulated electrical terminal 18. The terminal is removable and is electrically connected at its inboard end to a respective extremity of heating element 10 and extends outwardly of the crimped end portion of the outer shell at its outboard end for fixed connection to the free end of a respective connecting wire 20 having an opposite free end connected to a power source 22.

Preferentially, terminal 18 is of a generally flattened configuration and the crimped free end of the outer shell is crimped in a complementary fashion, as may be observed at the right end in FIG. 1, so as to provide a flared out flattened end portion 17, the diameter of the outer shell immediately adjacent the flared out end portion being held during the crimping operation so as to maintain the desired symmetrical tubular design of the device throughout the major portion of the length of the cooking assembly. As shown, the flared out flattened end portion defines a pair of spread wings on opposite sides of a central prong.

Figure 2:
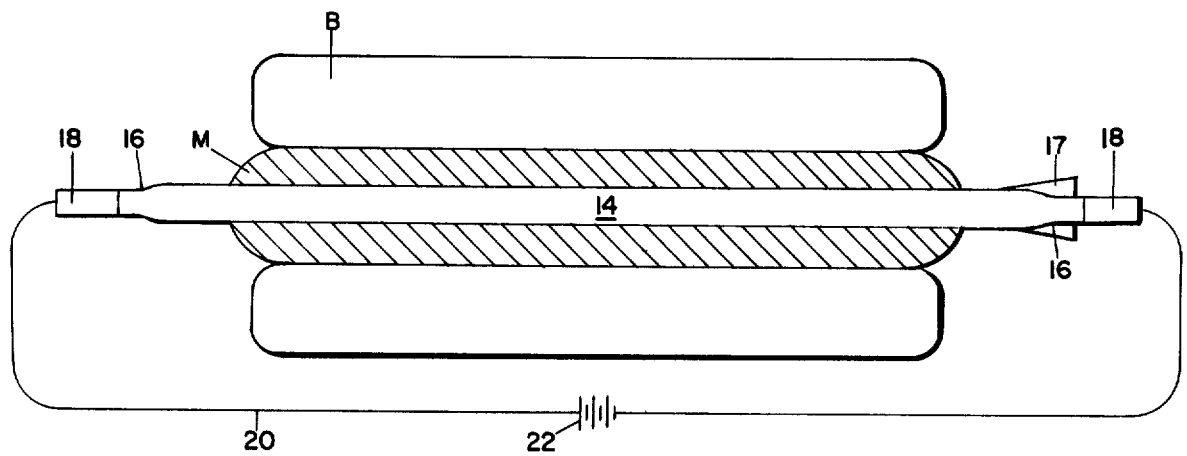
FIG. 2 is a view in top plan showing the FIG. 1 assembly of the invention in operational use.

Desirably, the terminals will have their inboard ends extendable inwardly to the extent that the heating of the free ends of the cooking assembly, outboard of the area occupied by a meat product M and baked product B, see FIG. 2, is diminished because of temperature gradients from the heating element to the terminal ends.

Operationally, the heating element will be adapted for a nominal wattage to insure throughout the elongated heating surface area an optimum heating in a uniform manner without the risk of burning.

Figure 3:
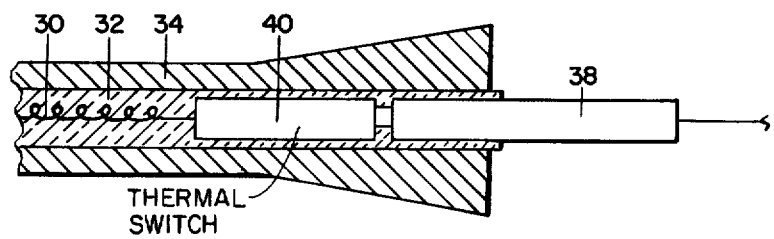
FIG. 3 is a fragmentary view in section of one end of a modified form of the cooking assembly of the invention.

With specific reference to FIG. 3, an alternative form of structure is disclosed showing a heating element 30, a circumscribing insulator 32 and an encapsulating outer shell 34 with an electrical terminal 38 electrically connecting to the outboard end of a thermal switch 40, the inboard end of which connects to the heating element.

Figure 4:
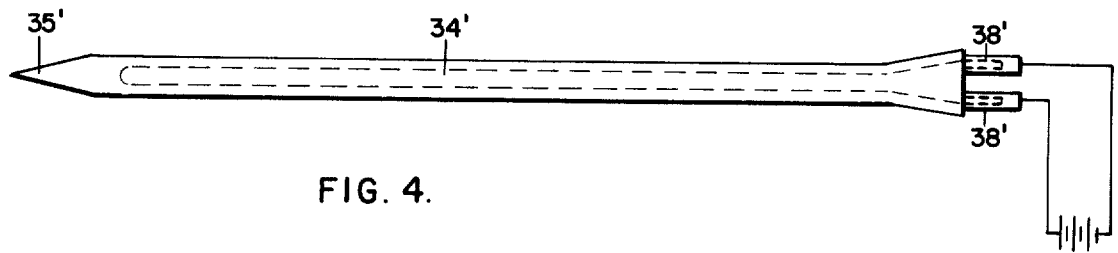
FIG. 4 is a side elevational view of a modified form of the cooking assembly of the invention.
Figure 5:
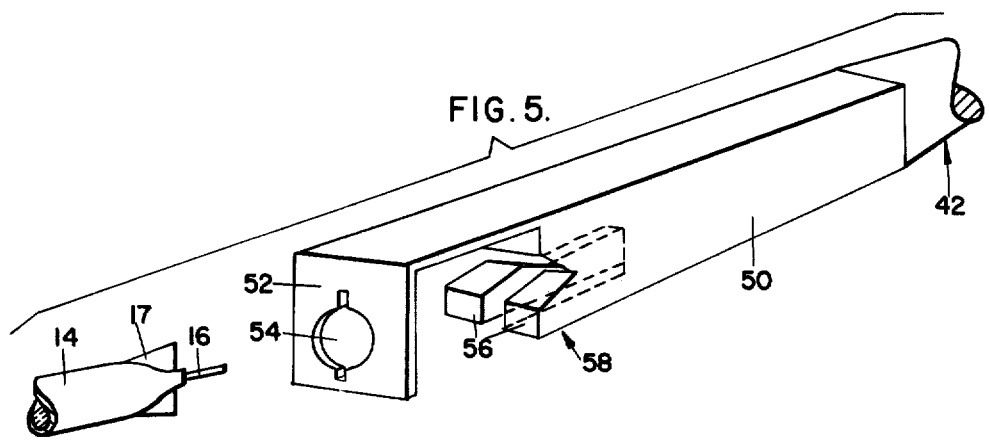
FIG. 5 is a fragmentary view in perspective showing the inserting/removing tool used in connection with the operation of preparing the meat product for the insertion of the cooking assembly thereinto or for the removal of the cooking assembly therefrom.
Figure 6:
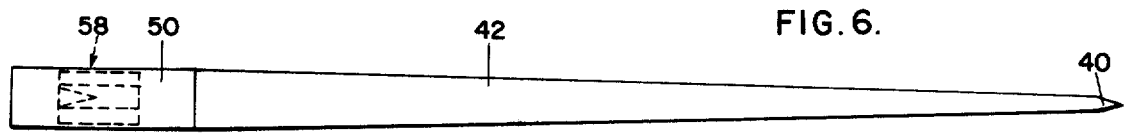
FIG. 6 is a small scale top plan view of the FIG. 5 tool.

With reference now to FIG. 4, an alternative form of cooking assembly is shown in which the two electrical terminals 38', 38' are disposed at the same end of the aluminum probe, of which only the outer sheathing 34' is shown, the return being picked up through the said outer sheathing. In this instance, the inboard extremity of the probe may be pointed as shown at 35' for ease of insertion into the meat product.

Operationally, the use of the assembly involves the frankurter or chopped beef cylinder or other meat product first being hand-held whilst the reaming end 40 of a plastic or like puncturing tool, generally designated by 42, is forced lengthwise through the central area of the product from one end to the other.

A suitable conductive element receiving opening having been made therewith, the puncturing tool is then withdrawn.

The cooking assembly of the invention is now ready for the insertion thereof into the opening so that the meat product is impaled upon the conductive element.

If the device is cold upon insertion, insertion may be by finger pressure alone.

If the device is hot from prior use, the removal tool would have to be used to remove the cooking assembly and would be employed as a handle for inserting the hot device in the second meat product to be cooked The grasping end of tool 42 opposite from reaming end 40, will be seen to provide a means for grasping the cooking assembly while same is hot for the removal and/or insertion of same.

The grasping end consists of a metal flange 50 provided with an outboard end wall 52 normal to the main flange axis, the end wall having a controlled diameter slotted opening 54 which is aligned with the opposed jaws 56 and 56 of a Vee block 58.

Tool 42 is slipped over the flanged end of the conductive element and is then rotated 90° for the removal of the cooking assembly, the flanges being then located adjacent the inner face of end wall 52.

Insertion is accomplished by the flange element entering the groove of the Vee block while the diameter of the conductive element is supported by the slotted opening 54.

The resultant entity — meat product and supporting bread product and conductive element — may then be placed upon a suitable tray or supporting member and each terminal then connected to the electrical power source for the cooking program.

After the desired cooking period (normally some 6 to 10 minutes), the wires are unplugged and the device withdrawn from the meat product with the insertion/removal tool.

The invention contemplates that a plurality of the devices may be connected in parallel so that the resultant unit has a capacity for cooking more than one meat sandwich at a time.

One salient desideratum hereof has been to provide a reliable, fool proof device which cooks from the internal center radially to the outward surface of the meat product rather than the reverse, ergo the terminology "internal conductive cooking" in the invention title.

Judicious experimentation has demonstrated that optimum cooking results without any excess burning are obtained when a large surface area is obtained with the configuration of the outer shell (i.e., a cylinder of about a ¼ inch diameter and a 6 inch length) having a smooth exterior surface (possibly Teflon coated to prevent sticking) and enclosing a heating element supporting a predetermined wattage.

Figure 7:
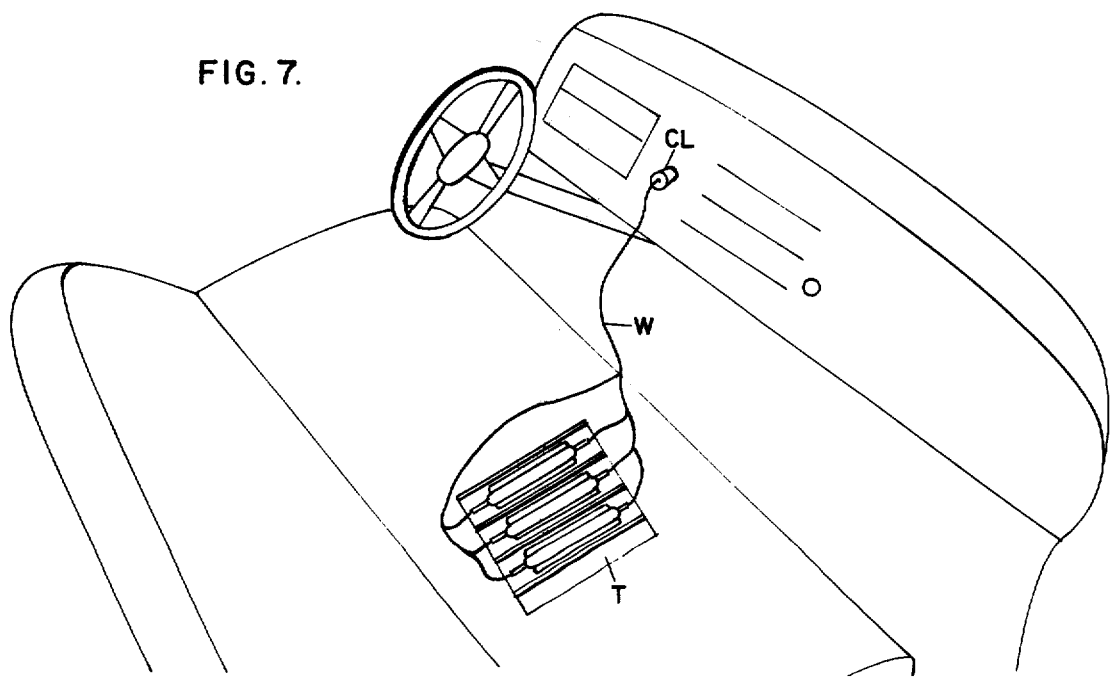
FIG. 7 is a fragmentary view in perspective of a vehicle showing a set of the cooking assemblies in operational use in a vehicle.

The invention envisions that cooking of more than a single food product at any moment is possible and desirable. For example, while the user's vehicle is underway, it is possible for a plurality of the cooking assemblies to be arranged in parallel, as shown in FIG. 7, same being placed upon a suitable tray T located say on the seat beside the vehicle operator and electrically connected by wires W to such as the vehicle cigarette lighter CL.

I claim:

1. In a meat product cooking assembly connectible to an appropriate power source in such as a vehicle or boat and functioning as an impaling member for impaling a meat product during a cooking program, the combination of:

an elongated electric heating element, a sheathing of electrical insulating material incapsulating the heating element, an outer tubular and metallic heat conductive shell circumscribing the sheathing, a thermal switch located within the outer shell, a first terminal extending out from a first end of the outer shell with one end of the heating element being connected thereto, the other end of the heating element being connected to one side of the thermal switch, a second terminal extending out of the second end of the outer shell with the other side of the thermal switch being connected thereto, the thermal switch being encapsulated in the sheathing of electrical insulating material, one end of the outer shell being crimped to define a pair of diametrically-opposed flattened winglike appendages for facilitating manipulation of the assembly during operational use, electrical connections extending from the terminals for connecting the heating element and thermal switch to the power source.

* * * * *